US008661643B1

(12) United States Patent
Utecht et al.

(10) Patent No.: US 8,661,643 B1
(45) Date of Patent: *Mar. 4, 2014

(54) PORTABLE HAND OPERATED HOSE FITTING SWAGING DEVICE

(71) Applicants: Peter W. Utecht, Hartford, WI (US); Richard D. Dresang, Hartford, WI (US)

(72) Inventors: Peter W. Utecht, Hartford, WI (US); Richard D. Dresang, Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,495

(22) Filed: Apr. 15, 2013

Related U.S. Application Data

(63) Continuation of application No. 13/534,419, filed on Jun. 27, 2012, now Pat. No. 8,522,414, which is a continuation of application No. 13/118,627, filed on May 31, 2011.

(51) Int. Cl.
*B23P 11/00* (2006.01)

(52) U.S. Cl.
USPC .................................. 29/282; 29/270; 29/252

(58) Field of Classification Search
USPC ......... 29/282, 252, 270, 244, 255, 278, 243.5
See application file for complete search history.

(56) References Cited

U.S. PATENT DOCUMENTS

| | | | | |
|---|---|---|---|---|
| 3,691,604 | A * | 9/1972 | Spontelli | 29/237 |
| 3,849,858 | A * | 11/1974 | Whitledge et al. | 29/237 |
| 3,858,298 | A * | 1/1975 | Whitledge et al. | 29/237 |
| 4,671,746 | A * | 6/1987 | Sessody | 417/437 |
| 6,434,808 | B1 * | 8/2002 | McKay | 29/237 |
| 7,155,790 | B2 * | 1/2007 | Palejwala et al. | 29/237 |
| 8,458,876 | B2 * | 6/2013 | Danhash | 29/237 |
| 8,522,414 | B1 * | 9/2013 | Utecht et al. | 29/282 |

* cited by examiner

*Primary Examiner* — Lee D Wilson
(74) *Attorney, Agent, or Firm* — Donald J. Ersler

(57) ABSTRACT

A portable hand operated hose fitting swaging device preferably includes a swaging frame, the pair of swaging die halves, a hydraulic cylinder, a hand hydraulic pump and a support base. The swaging frame includes a cylinder support, a pair of support straps and a die base. The two swaging die halves are retained in the die base. The swaging die halves include a bore to receive a hose end of a hose fitting. A fitting ram is attached to an end of the cylinder rod of the hydraulic cylinder. The hand hydraulic pump includes a pump, an accumulator and a pump relief valve. The pump includes a removable actuator rod. The removable actuator rod is pulled to generate an output of pressurized hydraulic fluid. The pump forces hydraulic fluid through an output opening. The output opening is connected to the hydraulic cylinder through at least one hydraulic line.

17 Claims, 12 Drawing Sheets

PORTABLE HAND OPERATED HOSE FITTING SWAGING DEVICE

CROSS-REFERENCES TO RELATED APPLICATIONS

This is a continuation-in-part application taking priority from continuation-in-part patent application Ser. No. 13/534,419 filed on Jun. 27, 2012, now U.S. Pat. No. 8,522,414, which takes priority from nonprovisional patent application Ser. No. 13/118,627 filed on May 31, 2011.

BACKGROUND OF THE INVENTION

1. Field of the Invention

The present invention relates generally to hydraulic hoses with fittings and more specifically to a portable hand operated hose fitting swaging device, which allows a hose fitting to be attached to a hose with a device that may be easily transported by hand.

2. Discussion of the Prior Art

There are numerous devices in the art for swaging a fitting on the end of a hose. There are automated portable units that are very heavy and require wheeled transport. There are also hand operated units, which weigh less and are more compact than the automated units, but require manual input to perform the swaging operation. U.S. Pat. No. 3,849,858 to Whitledge et al. discloses a swaging apparatus. U.S. Pat. No. 3,858,298 to Whitledge et al. discloses a swaging apparatus.

Accordingly, there is a clearly felt need in the art for a portable hand operated hose fitting swaging device, which allows a hose fitting to be attached to a hose with a device that may be easily transported by hand.

SUMMARY OF THE INVENTION

The present invention provides a portable hand operated hose fitting swaging device, which allows a hose fitting to be attached to a hose with a device that may be easily transported by hand. An automated reduced weight hose fitting swaging device (hose fitting swaging device) preferably includes a swaging frame, a pair of swaging die halves, a hydraulic cylinder and a hydraulic pump. The swaging frame preferably includes a cylinder support, a pair of support straps and a die base. The die base includes a die bore, which is sized to receive the pair of swaging die halves. Each swaging die half includes a substantially conical half bore which is sized to receive an outer perimeter of a hose end of a hose fitting. However, the substantially conical bore could also be formed in the die base.

The hydraulic cylinder includes a cylinder rod. A fitting ram is attached to an end of the cylinder rod. The fitting ram preferably includes a replaceable ram disc to receive a threaded end of a hose fitting. The hydraulic pump includes a pump and an accumulator. The pump includes a drive shaft, which may be rotated by a portable drill or the like. The accumulator stores hydraulic fluid, which the pump forces out through an output opening. The output opening in the hydraulic pump is connected to one end of a check valve. The other end of the check valve is connected to a first port of a Y-connector. A second port of the Y-connector is connected to an input port of the hydraulic cylinder. A third port of the Y-connector is connected to one port of a shut-off valve and the other port of the shut valve is connected to the accumulator.

In use, a pair of swaging die halves with an appropriate substantially conical bore are loaded into the die bore. The hose end of the hose fitting is inserted into the substantially conical bore in the pair of swaging die halves. The appropriate size replaceable ram disc is inserted into the fitting ram. The shut-off valve is closed. The portable drill or the like is attached to the drive shaft. The drive shaft is rotated, until the hose end is crimped on a hose. The shut-off valve is opened, until the cylinder rod fully retracts into the hydraulic cylinder. The shut valve is then closed. The hose fitting with the hose secured thereto is removed from the pair of swaging die halves.

The portable hand operated hose fitting swaging device (hose fitting swaging hand device) preferably includes the swaging frame, the pair of swaging die halves, a hydraulic cylinder and a hand hydraulic pump. A fitting ram is attached to an end of the cylinder rod of the hydraulic cylinder. The hand hydraulic pump includes a pump, an accumulator and a pump relief valve. The pump includes an actuator rod, which is actuated or pulled to generate pressurized hydraulic fluid. The accumulator stores hydraulic fluid, which the pump forces out through an output fitting. The output fitting in the hand hydraulic pump is connected to an input port of the hydraulic cylinder through at least one hydraulic line.

In use, the pair of swaging die halves with an appropriate substantially conical bore are loaded into the die bore. The hose end of the hose fitting is inserted into the substantially conical bore in the pair of swaging die halves. The appropriate size replaceable ram disc is inserted into the fitting ram. The hose is inserted into the hose fitting. The pump relief valve is closed. The hand hydraulic pump is actuated, until the hose end is crimped on the hose. The pump relief valve is opened, until the cylinder rod fully retracts into the hydraulic cylinder. The pump relief valve is then closed. The hose fitting with the hose secured thereto is removed from the pair of swaging die halves.

A second embodiment of the hose fitting swaging hand device preferably includes the swaging frame, the pair of swaging die halves, a hydraulic cylinder, a hand hydraulic pump and a support base. The fitting ram is attached to an end of the cylinder rod of the hydraulic cylinder. The hand hydraulic pump includes a pump, an accumulator and a pump relief valve. The pump preferably includes a removable actuator rod, which is inserted into a pump collar. The removable actuator rod is actuated or pulled to generate an output of pressurized hydraulic fluid. The accumulator stores hydraulic fluid, which the pump forces out through an output fitting. The output fitting in the hand hydraulic pump is connected to an input port of the hydraulic cylinder through at least one hydraulic line. A bottom of the swaging frame is mounted to a top of the support base and the hand hydraulic pump is mounted to a top of the support base, adjacent the swaging frame.

In use, the pair of swaging die halves with an appropriate substantially conical bore are loaded into the die bore. The hose end of the hose fitting is inserted into the substantially conical bore in the pair of swaging die halves. The appropriate size replaceable ram disc is inserted into the fitting ram. The hose is inserted into the hose fitting. The pump relief valve is closed. The hand hydraulic pump is actuated, until the hose end is crimped on the hose. The pump relief valve is opened, until the cylinder rod fully retracts into the hydraulic cylinder. The pump relief valve is then closed. The hose fitting with the hose secured thereto is removed from the pair of swaging die halves.

Accordingly, it is an object of the present invention to provide a hose fitting swaging hand device, which allows a fitting to be attached to a hose with a hand operated device.

These and additional objects, advantages, features and benefits of the present invention will become apparent from the following specification.

DETAILED DESCRIPTION OF THE PREFERRED EMBODIMENTS

Figure 6:
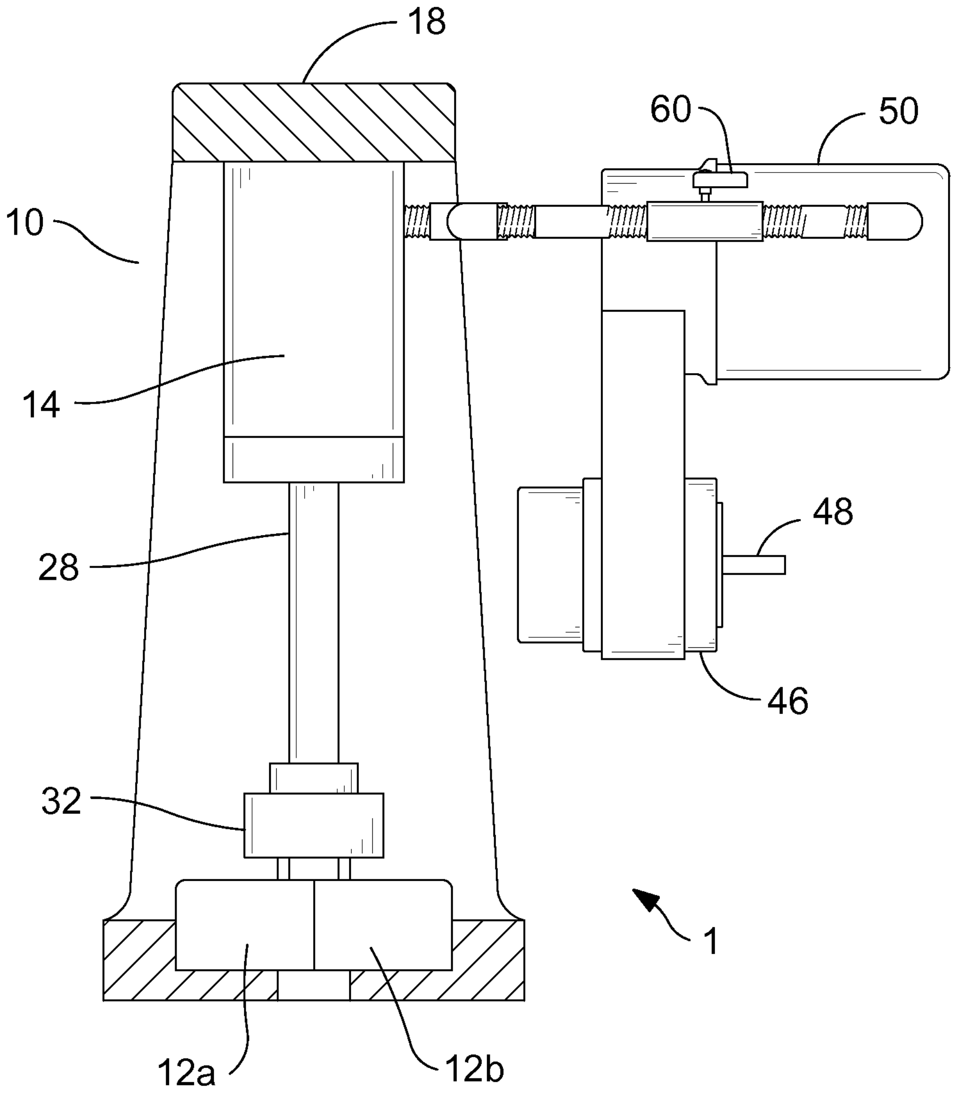
FIG. 6 is a cross sectional side view of a hose fitting swaging device with a hose fitting retained therein in accordance with the present invention.

With reference now to the drawings, and particularly to FIG. 6, there is shown a cross sectional side view of a hose fitting swaging device 1. With reference to FIGS. 1-4, the hose fitting swaging device 1 preferably includes a swaging frame 10, a pair of swaging die halves **12*a*, 12*b*, a hydraulic cylinder 14 and a hydraulic pump 16. The swaging frame 10 includes a cylinder support 18, a pair of support straps 20*a*, 20*b* and a die base 22. The cylinder support 18 is retained on one end of the pair of support straps 20*a*, 20*b* and the die base 22 is retained on the opposite end of the pair of support straps 20*a*, 20*b*. A die bore 24 is formed in the die base 22 to receive the pair of swaging die halves 12*a*, 12*b*. A hose clearance hole 25 is formed through a bottom of the die base 22 to provide clearance for a hose 106. Each swaging die half 12*a*, 12*b*, includes a substantially conical half bore 26*a*, 26*b*, which is sized to receive an outer perimeter of a hose end 102 of a hose fitting 100. The substantially conical half bore 26*a*, 26*b* could include multiple conical bores with different perimeter dimensions and/or different taper angles. The hose end 102 is disposed on one end of the hose fitting 100 and a threaded end 104** is disposed on the opposite end thereof.

Figure 7:
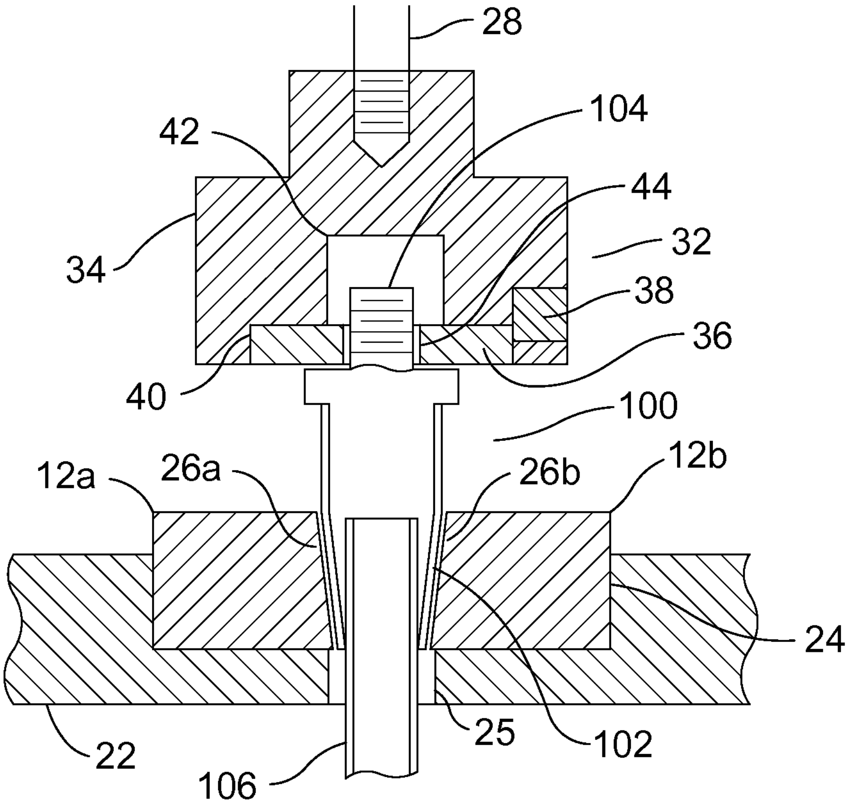
FIG. 7 is an enlarged cross sectional view of a hose fitting being swaged on a hose of a hose fitting swaging device in accordance with the present invention.
Figure 8:
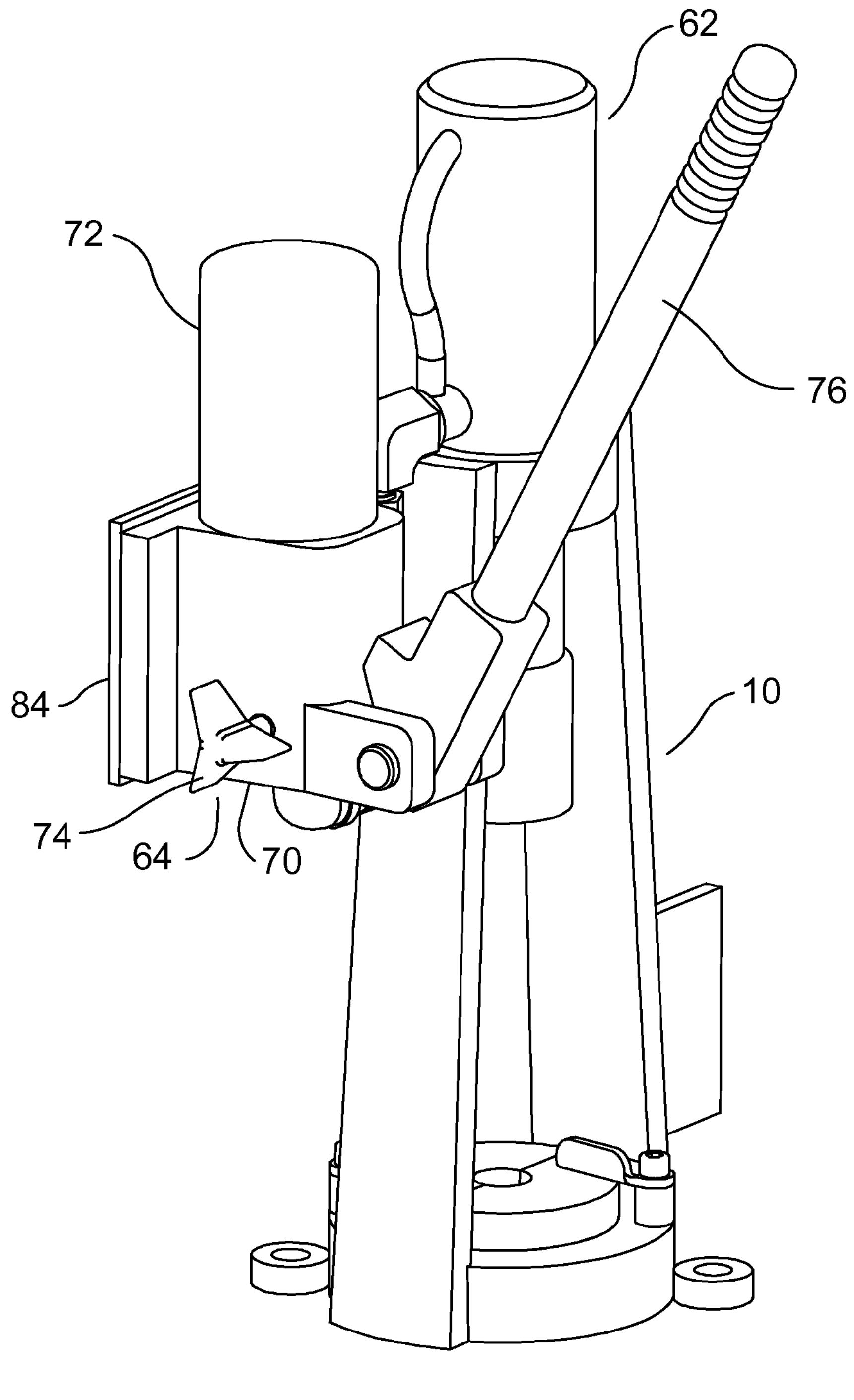
FIG. 8 is a perspective view of a hose fitting swaging hand device in accordance with the present invention.
Figure 9:
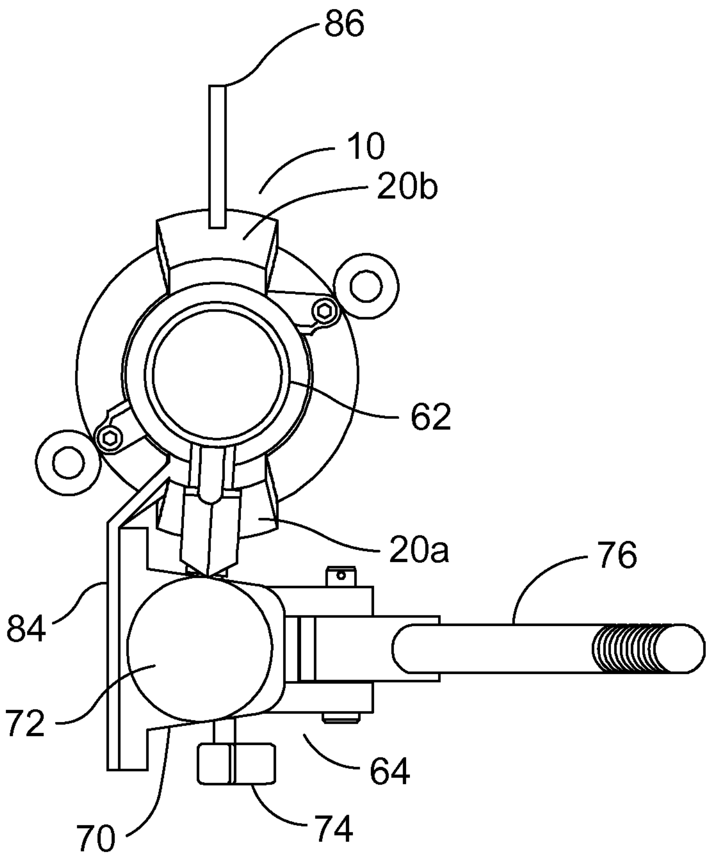
FIG. 9 is a top view of a hose fitting swaging hand device in accordance with the present invention.
Figure 10:
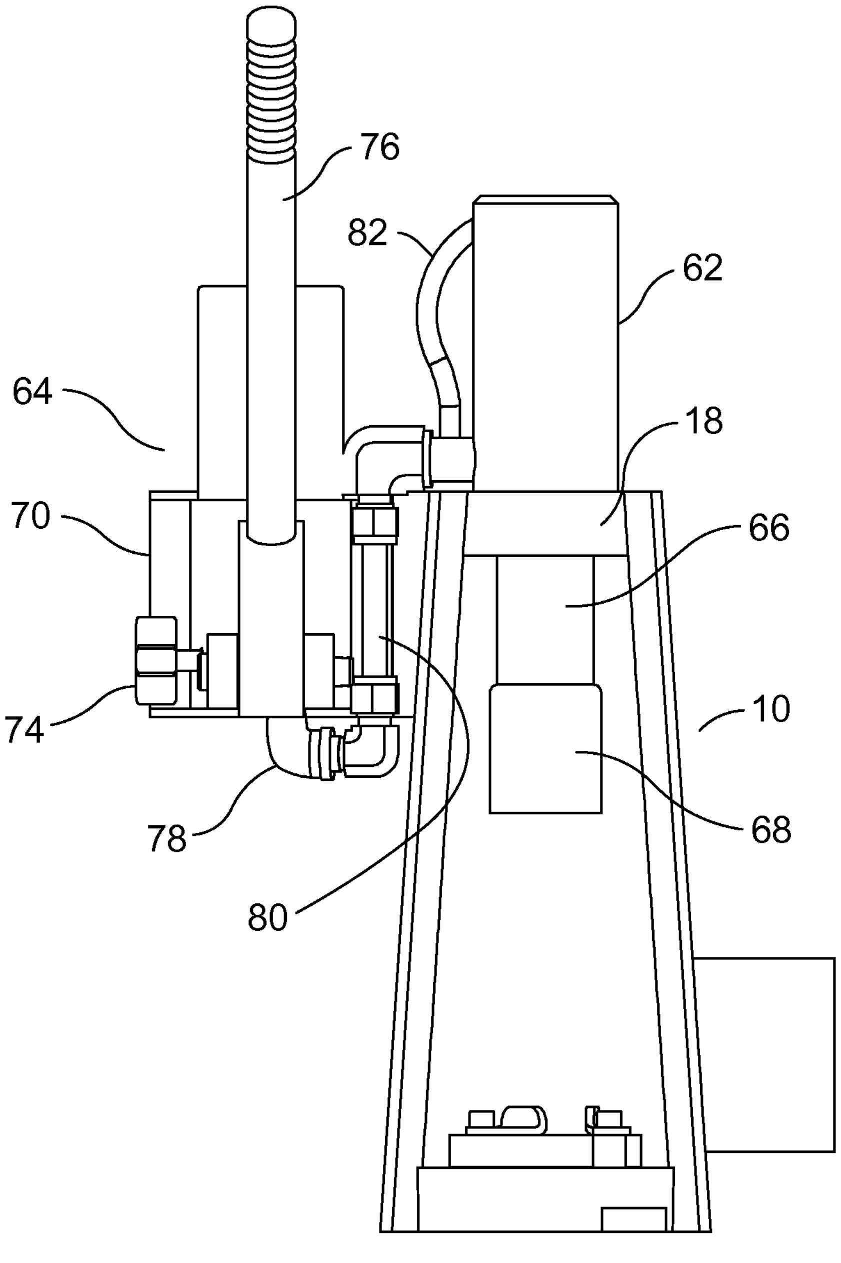
FIG. 10 is a front view of a hose fitting swaging hand device in accordance with the present invention.
Figure 11:
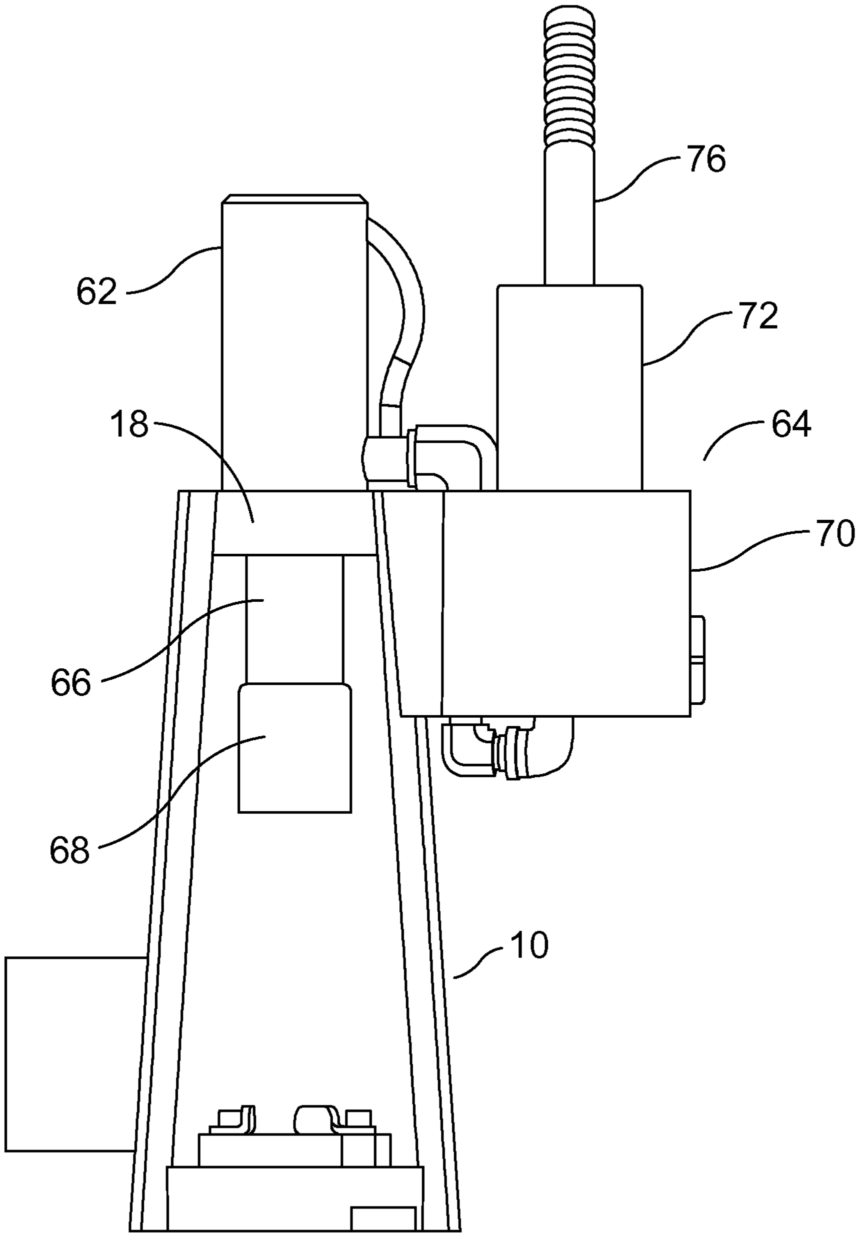
FIG. 11 is a rear view of a hose fitting swaging hand device in accordance with the present invention.

The hydraulic cylinder 14 includes a cylinder rod 28. The hydraulic cylinder 14 is preferably a bottle hydraulic cylinder. A top of the hydraulic cylinder 14 is preferably secured to the cylinder support 18 with a pair of fasteners 30. With reference to FIG. 7, a fitting ram 32 is preferably threaded on to an end of the cylinder rod 28. The fitting ram 32 preferably includes a ram body 34, a removable ram disc 36 and a magnet 38. A disc bore 40 is formed in one end of the ram body 34 to receive the removable ram disc 36. The magnet 38 is preferably pressed into a side of the ram body 34 such that it is adjacent the removable ram disc 36 when the removable ram disc 36 is inserted into the disc bore 40. The magnet 38 retains the removable ram disc 36 in the disc bore 40. A thread relief bore 42 is also formed in one end of the fitting ram 32 to provide clearance for the threaded end 104. The cylinder rod 28 is threaded into the opposite end of the ram body 34. A plurality of ram discs 36 include different size thread openings 44 for different size threaded ends. However, multiple fitting rams with different thread relief bores for different sized threaded ends may also be used.

The hydraulic pump 16 includes a pump 46 and an accumulator 50. The pump 46 includes a drive shaft 48, which may be rotated by a portable drill 110 or the like. The accumulator 50 stores hydraulic fluid (such as grease), which the pump 46 forces out through an output opening 52. The output opening 52 in the hydraulic pump 16 is connected to one end of a check valve 54. The other end of the check valve 54 is connected to a first port of a Y-connector 56. A second port of the Y-connector 56 is connected to an input port 58 of the hydraulic cylinder 14. A third port of the Y-connector 56 is connected to one port of a shut-off valve 60 and the other port of the shut-off valve 60 is connected to an input port 55 of the accumulator 50. The hydraulic pump 16 is preferably taken from an electric grease gun. Electric grease guns are well known in the art and need not be explained in further details.

Figure 1:
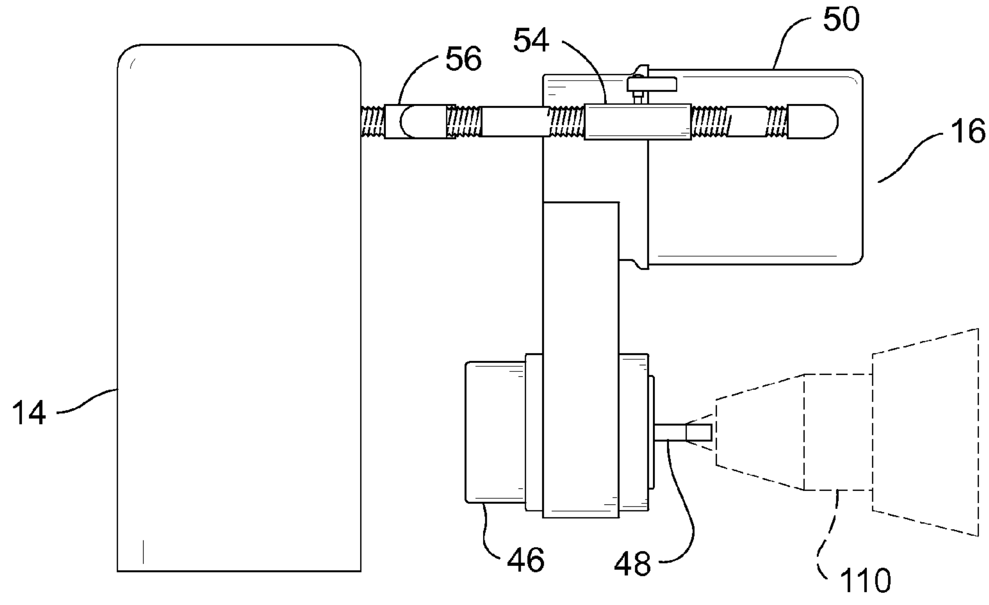
FIG. 1 is a side view of a hydraulic pump connected to a hydraulic cylinder of a hose fitting swaging device in accordance with the present invention.
Figure 2:
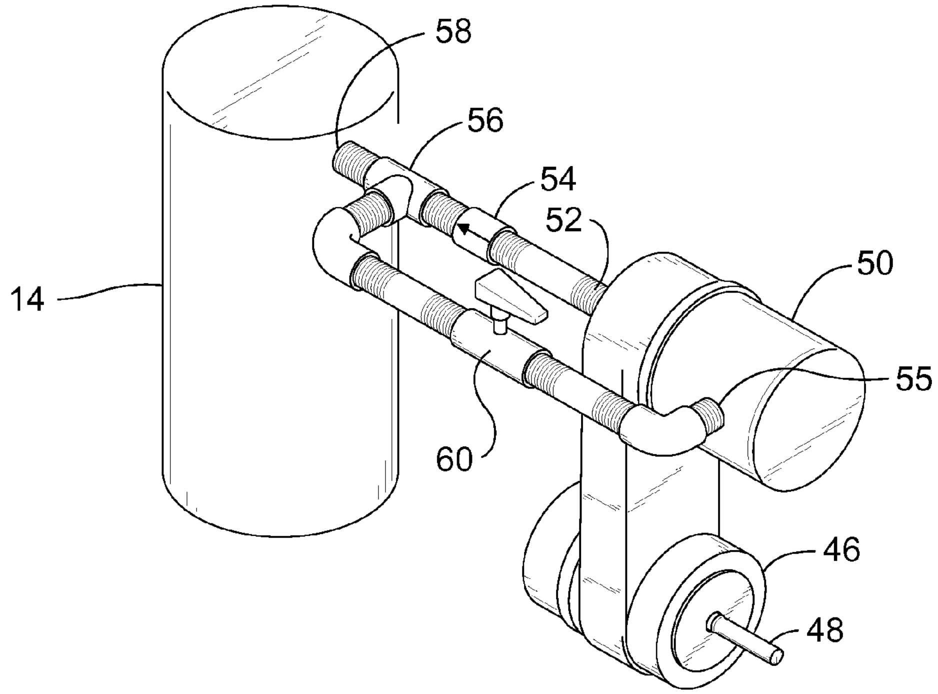
FIG. 2 is a perspective view of a hydraulic pump connected to a hydraulic cylinder of a hose fitting swaging device in accordance with the present invention.
Figure 3:
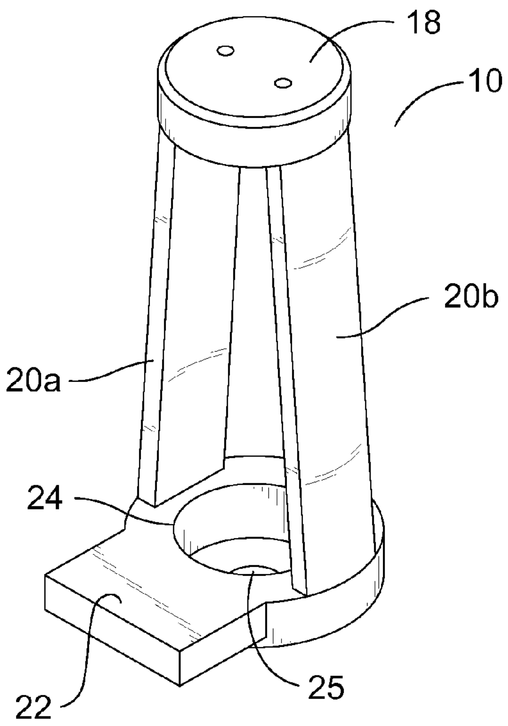
FIG. 3 is a perspective view of a swaging frame of a hose fitting swaging device in accordance with the present invention.
Figure 4:
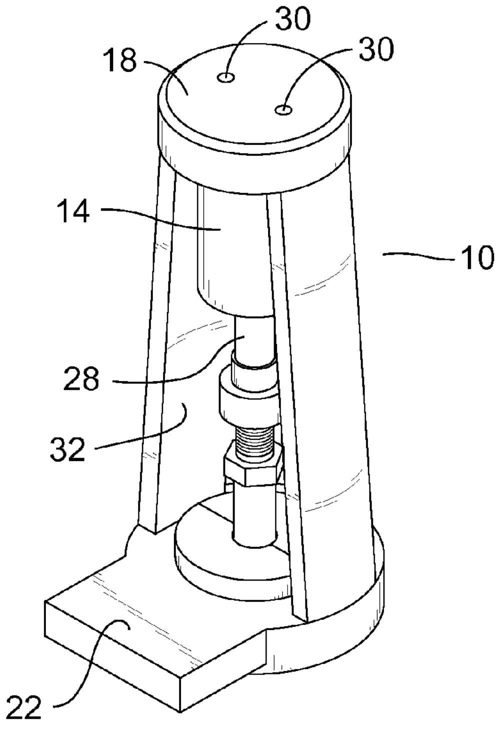
FIG. 4 is a perspective view of a hose fitting swaging device without a hydraulic pump in accordance with the present invention.
Figure 5:
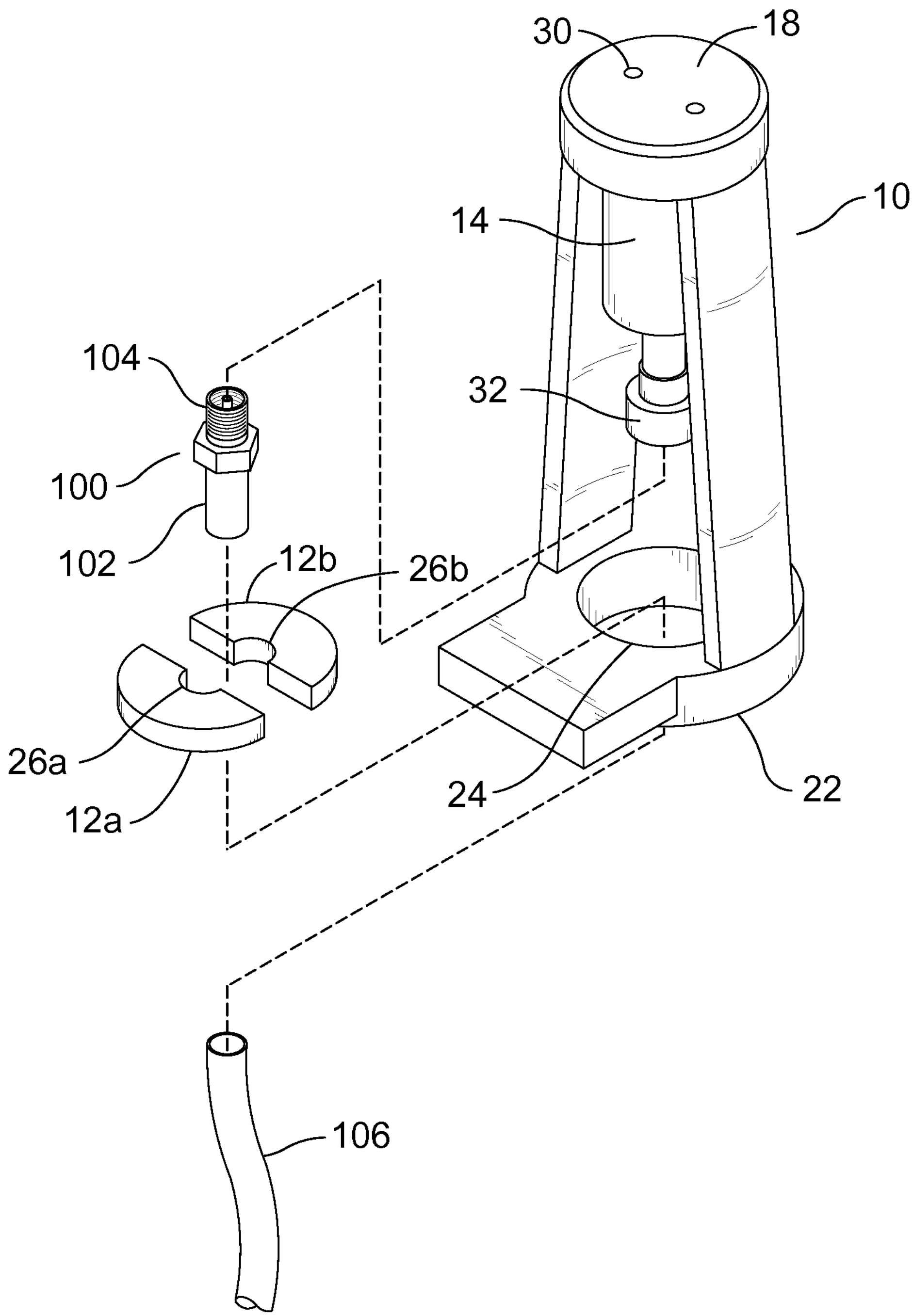
FIG. 5 is a partially exploded perspective view of a hose fitting swaging device with a hose fitting and hose, without a hydraulic pump in accordance with the present invention.

With reference to FIG. 5, the hose fitting swaging device 1 is preferably used in the following manner. The pair of swaging die halves **12*a*, 12*b* are loaded into the die bore 24. The hose end 102 is inserted into the substantially conical bore 26*a*, 26*b* in the pair of swaging die halves 12*a*, 12*b*. The appropriate size removable ram disc 36 is inserted into the disc bore 40. The shut-off valve 60 is closed. The portable drill 110 or the like is attached to the drive shaft 48. The drive shaft 48 is rotated, until the hose end 102 is crimped on the hose 106. The shut-off valve 60 is opened, until the cylinder rod 28 fully retracts into the hydraulic cylinder 14. The shut valve 60 is then closed. The hose fitting 100 with the hose 106 secured thereto is removed from the pair of swaging die halves 12*a*, 12*b***.

With reference to FIGS. 8-11, a hose fitting swaging hand device 2 preferably includes the swaging frame 10, the pair of swaging die halves **12*a*, 12*b*, a hydraulic cylinder 62 and a hand hydraulic pump 64. The hydraulic cylinder 62 includes a cylinder rod 66. The hydraulic cylinder 62 is preferably a bottle hydraulic cylinder with a spring return cylinder rod 66. A bottom of the hydraulic cylinder 62 is preferably secured to the cylinder support 18 with a pair of fasteners (not shown). A fitting ram 68 is preferably threaded on to an end of the cylinder rod 66. The fitting ram 68 preferably includes a ram body, a removable ram disc and a magnet, similar to the fitting ram 32**. A plurality of ram discs include different size thread openings for different size threaded ends. However, multiple fitting rams with different thread relief bores for different sized threaded ends may also be used.

The hand hydraulic pump 64 includes a pump 70, an accumulator 72 and a pump relief valve 74. The hand hydraulic pump 64 is preferably a two stage 10,000 psi hand pump. The pump 70 includes an actuator rod 76, which is pulled to generate pressurized hydraulic fluid. The accumulator 72 stores hydraulic fluid, which actuation of the actuator rod 76 forces out through an output fitting 78. The output fitting 78 in the hydraulic pump 64 is connected to an input port of the hydraulic cylinder 62 preferably through a first hydraulic line 80 and a second hydraulic line 82. A pump bracket 84 is attached to one of the pair of support straps 20*a*, 20*b*, preferably with welding. The hydraulic pump 64 is preferably attached to the pump bracket 84 with at least two fasteners (not shown). A vise flange 86 is preferably welded to the other one of the pair of support straps 20*a*, 20*b*. The vise flange 86 is sized to be clamped in a vise. The hose fitting swaging hand device 2 preferably weighs less than at least one of 20 lbs., 25 lbs. and 30 lbs.

The hose fitting swaging device 2 is preferably used in the following manner. With reference to FIG. 5, the pair of swaging die halves 12*a*, 12*b* are loaded into the die bore 24. The hose end 102 is inserted into the substantially conical bore 26*a*, 26*b* in the pair of swaging die halves 12*a*, 12*b*. The appropriate size removable ram disc 36 is inserted into the disc bore 40. The hose 106 is inserted into the hose end 102. The pump relief valve 74 is closed. The actuator rod 76 is actuated or pulled, until the hose end 102 is crimped on the hose 106. The pump relief valve 74 is opened, until the cylinder rod 66 fully retracts into the hydraulic cylinder 62 and allows hydraulic fluid to flow back into the accumulator 72. The pump relief valve 74 is then closed. The hose fitting 100 with the hose 106 secured thereto is removed from the pair of swaging die halves 12*a*, 12*b*.

Figure 12:
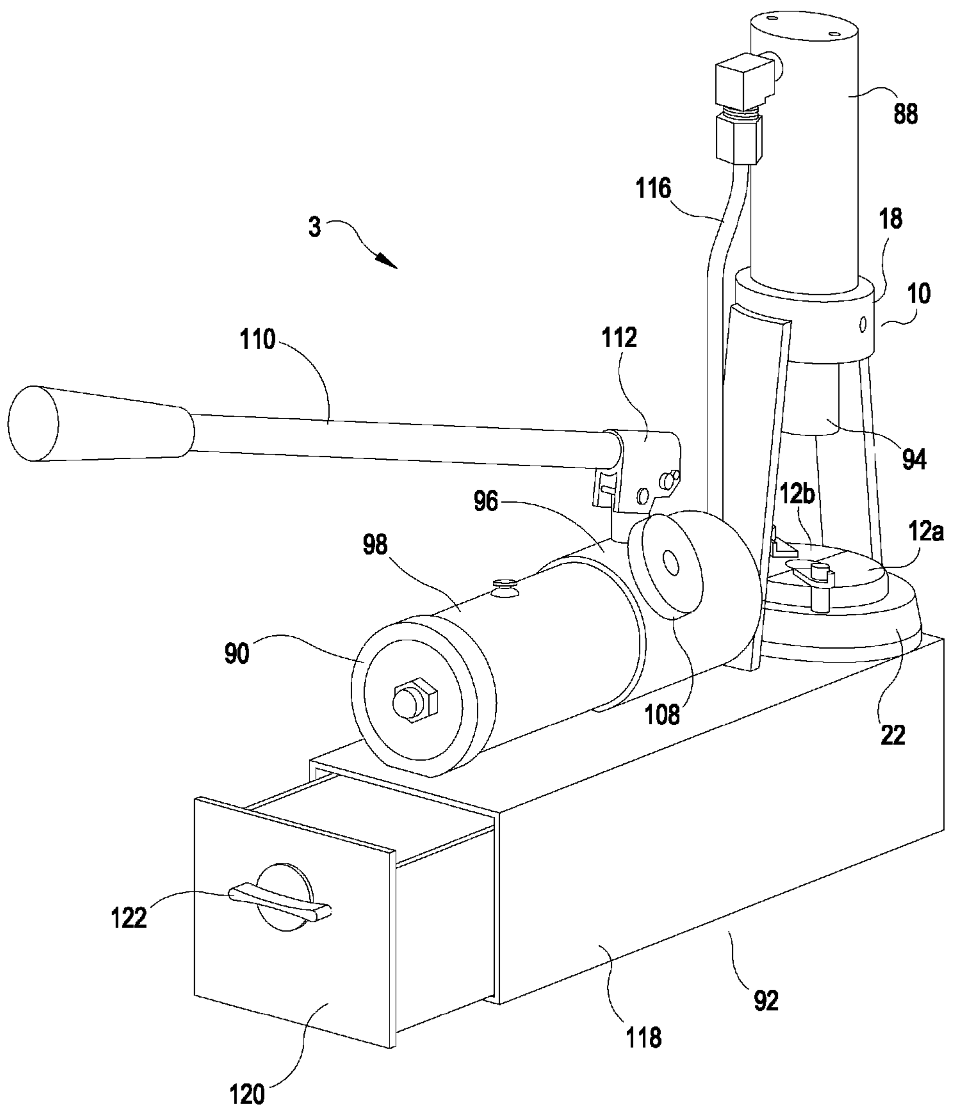
FIG. 12 is a perspective view of a second embodiment of a hose fitting swaging hand device in accordance with the present invention.
Figure 13:
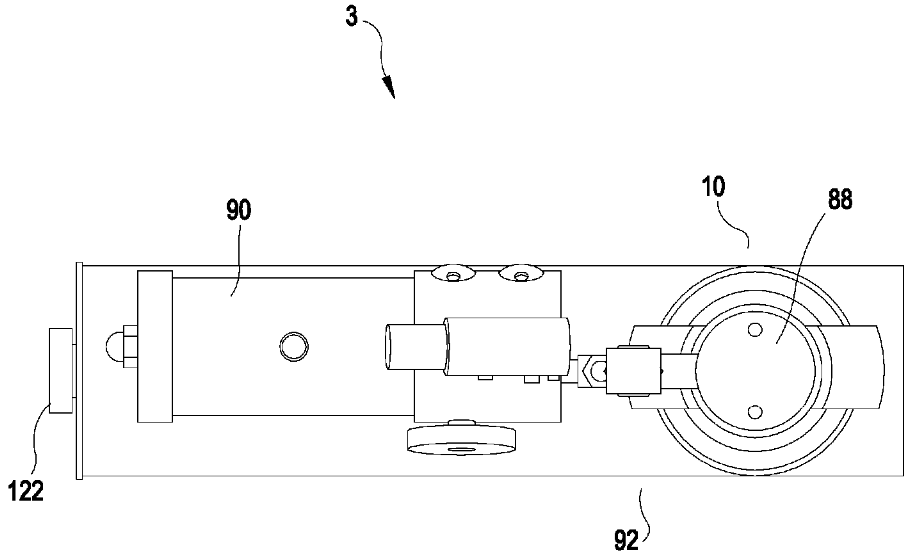
FIG. 13 is a top view of a second embodiment of a hose fitting swaging hand device in accordance with the present invention.
Figure 14:
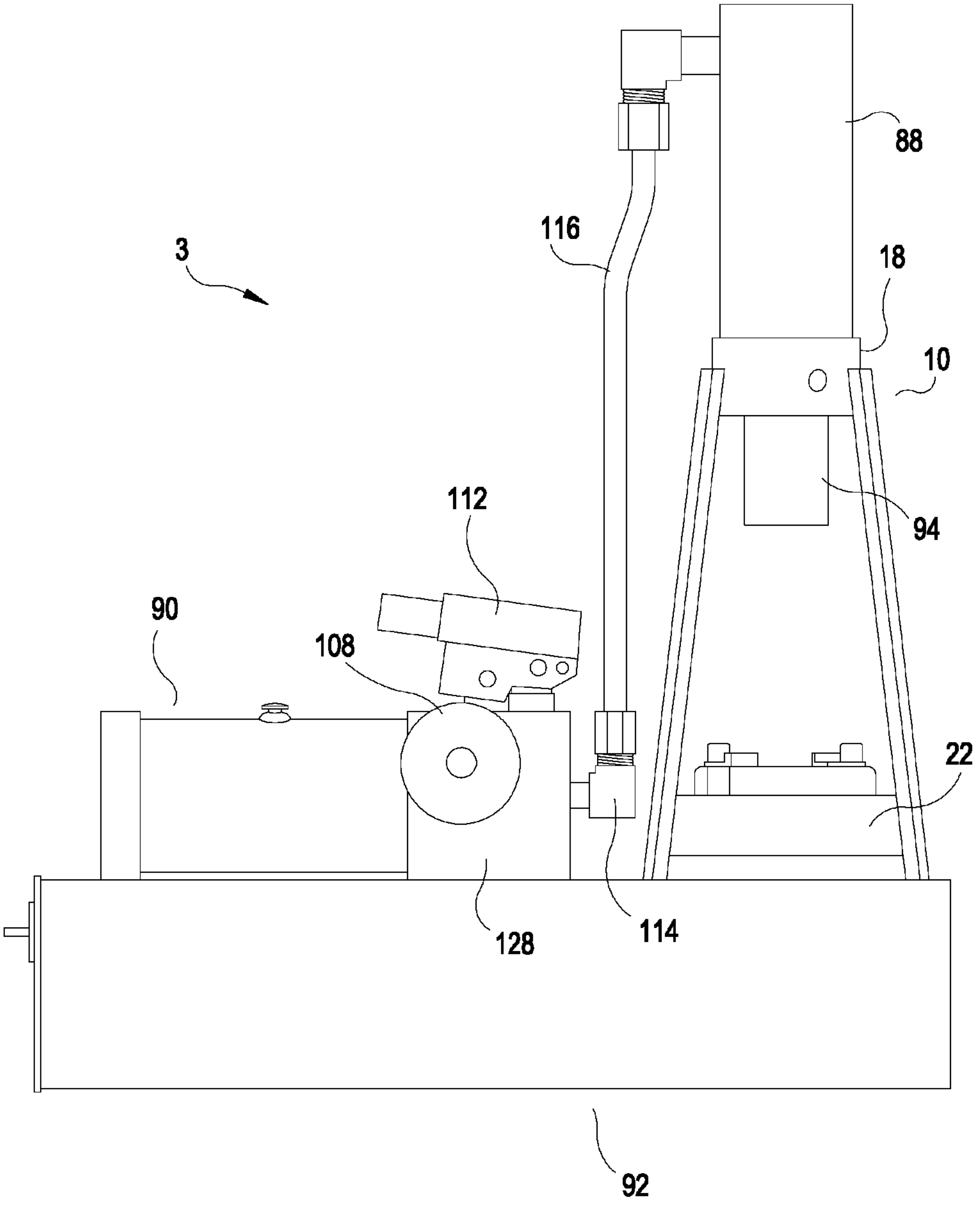
FIG. 14 is a front view of a second embodiment of a hose fitting swaging hand device in accordance with the present invention.

With reference to FIGS. 12-14, a second embodiment of a hose fitting swaging hand device 3 preferably includes the swaging frame 10, the pair of swaging die halves 12*a*, 12*b*, a hydraulic cylinder 88, a hand hydraulic pump 90 and a support base 92. The hydraulic cylinder 88 is preferably a bottle hydraulic cylinder with a spring return cylinder rod 94. A bottom of the hydraulic cylinder 88 is preferably secured to the cylinder support 18 with a pair of fasteners (not shown). A fitting ram 68 (shown in FIG. 10) is preferably threaded on to an end of the cylinder rod 94. The fitting ram 68 preferably includes the ram body, the removable ram disc and the magnet, similar to the fitting ram 32. A plurality of ram discs include different size thread openings for different size threaded ends. However, multiple fitting rams with different thread relief bores for different sized threaded ends may also be used.

The hand hydraulic pump 90 includes a pump 96, an accumulator 98 and a pump relief valve 108. The hand hydraulic pump 90 is preferably a two stage 10,000 psi hand pump. The pump 96 preferably includes a removable actuator rod 110, which is inserted into a pump collar 112. The removable actuator rod 110 is actuated or pulled to generate pressurized hydraulic fluid. The accumulator 98 stores hydraulic fluid, which actuation of the actuator rod 110 forces out through an output fitting 114. The output fitting 114 in the hand hydraulic pump 90 is connected to an input port of the hydraulic cylinder 88 through a hydraulic line 116.

The support base 92 preferably includes a support tube 118 and a component drawer 120. However, other designs of support bases may also be used. The component drawer 120 is sized to be slidably received by an inner perimeter of the support tube 118. A drawer lock 122 is preferably retained in a front of the component drawer 120. The die base 22 of the swaging frame 10 is attached to a top of the support tube 118 with fasteners or the like (not shown). A fastening base 128 of the hand hydraulic pump 90 is attached to a top of the support tube 118 with fasteners or the like (not shown), adjacent the swaging frame 10. The hose fitting swaging hand device 3 preferably weighs less than at least one of 20 lbs., 25 lbs. and 30 lbs.

The hose fitting swaging device 3 is preferably used in the following manner. With reference to FIGS. 7 and 12-14, the pair of swaging die halves 12*a*, 12*b* are loaded into the die bore 24. The hose end 102 is inserted into the substantially conical bore 26*a*, 26*b* in the pair of swaging die halves 12*a*, 12*b*. The appropriate size removable ram disc 36 is inserted into the disc bore 40. The hose 106 is inserted into the hose end 102. The pump relief valve 108 is closed. The removable actuator rod 110 is inserted into a pump collar 112. The removable actuator rod 110 is actuated or pulled, until the hose end 102 is crimped on the hose 106. The pump relief valve 108 is opened, until the cylinder rod 94 fully retracts into the hydraulic cylinder 88 and allows hydraulic fluid to flow back into the accumulator 98. The pump relief valve 108 is then closed. The hose fitting 100 with the hose 106 secured thereto is removed from the pair of swaging die halves 12*a*, 12*b*.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A hand operated hose fitting swaging device comprising:

a swaging frame includes a cylinder support on one end and a die base on the other end, a hose end bore is formed in said die base for receiving a hose end of a hose fitting;

a hydraulic cylinder includes a cylinder rod extending from one end thereof, said hydraulic cylinder is retained by said cylinder support; and a hand hydraulic pump includes a pump and an accumulator, said pump includes an actuator rod which is actuated to generate pressurized hydraulic fluid, said accumulator stores the hydraulic fluid, said die base and said hand hydraulic pump are mounted to a support base, wherein actuation of said actuator rod forces the hydraulic fluid to actuate said cylinder rod which forces the hose end to crimp a hose inserted therein.

2. The hand operated hose fitting swaging device of claim 1, further comprising:

a fitting ram includes a threaded rod hole on one end and a relief opening on the other end, said cylinder rod is threaded into said threaded rod hole, said relief hole is sized to receive a threaded end of the hose fitting.

3. The hand operated hose fitting swaging device of claim 1, further comprising:

a fitting ram includes a ram body, a removable ram disc and a magnet, a disc bore is formed in one end of said ram body to receive said ram disc, said cylinder rod is threaded into the other end of said ram body, said removable ram disc includes a relief opening which is sized to receive a threaded end of the hose fitting, said magnet is retained in a side of said disc bore to retain said removable ram disc.

4. The hand operated hose fitting swaging device of claim 1, further comprising:

said hand hydraulic pump includes an output port and a pump relief valve, said output port of said hydraulic cylinder is coupled to an input port of said hydraulic cylinder, wherein said pump relief valve is closed to operate said hand hydraulic pump.

5. The hand operated hose fitting swaging device of claim 1, further comprising:

said die base is retained on one end of a pair of support straps and said cylinder support is retained on the other end of said support straps.

6. The hand operated hose fitting swaging device of claim 1, further comprising:

said support base includes a support tube and a component drawer, said component drawer is sized to be slidably received by an inner perimeter of said support tube.

7. The hand operated hose fitting swaging device of claim 6, further comprising:

a drawer lock is attached to an end of said drawer to lock said component drawer relative to said support tube.

8. A hand operated hose fitting swaging device comprising:

a swaging frame includes a cylinder support on one end and a die base on the other end, a substantially conically shaped bore is formed in said die base for receiving a hose end of a hose fitting;

a hydraulic cylinder includes a cylinder rod extending from one end thereof, said hydraulic cylinder is retained by said cylinder support; and a hand hydraulic pump includes a pump and an accumulator, said pump includes an actuator rod which is actuated to generate pressurized hydraulic fluid, said accumulator stores the hydraulic fluid, said die base and said hand hydraulic pump are mounted to a support base, wherein actuation of said actuator rod forces the hydraulic fluid to actuate said cylinder rod which forces the hose end to crimp a hose inserted therein.

9. The hand operated hose fitting swaging device of claim 8, further comprising:

a fitting ram includes a threaded rod hole on one end and a relief opening on the other end, said cylinder rod is threaded into said threaded rod hole, said relief hole is sized to receive a thread end of the hose fitting.

10. The hand operated hose fitting swaging device of claim 8, further comprising:

a fitting ram includes a ram body, a removable ram disc and a magnet, a disc bore is formed in one end of said ram body to receive said ram disc, said cylinder rod is threaded into the other end of said ram body, said removable ram disc includes a relief opening which is sized to receive a threaded end of the hose fitting, said magnet is retained in a side of said disc bore to retain said removable ram disc.

11. The hand operated hose fitting swaging device of claim 8, further comprising:

said hand hydraulic pump includes an output port and a pump relief valve, said output port of said hydraulic cylinder is coupled to an input port of said hydraulic cylinder, wherein said pump relief valve is closed to operate said hand hydraulic pump.

12. The hand operated hose fitting swaging device of claim 8, further comprising:

said die base is retained on one end of a pair of support straps and said cylinder support is retained on the other end of said support straps.

13. The hand operated hose fitting swaging device of claim 8, further comprising:

said support base includes a support tube and a component drawer, said component drawer is sized to be slidably received by an inner perimeter of said support tube.

14. A hand operated hose fitting swaging device comprising:

a swaging frame includes a cylinder support on one end and a die base on the other end;

a pair of swaging die halves are retained in a die bore formed in said die base, said pair of swaging die halves include a bore for receiving a hose end of a hose fitting;

a hydraulic cylinder includes a cylinder rod extending from one end thereof, said hydraulic cylinder is retained by said cylinder support; and a hand hydraulic pump includes a pump and an accumulator, said pump includes an actuator rod which is actuated to generate pressurized hydraulic fluid, said accumulator stores the hydraulic fluid, said die base and said hand hydraulic pump are mounted to a support base, wherein actuation of said actuator rod forces the hydraulic fluid to actuate said cylinder rod which forces the hose end to crimp a hose inserted therein.

15. The hand operated hose fitting swaging device of claim 14, further comprising:

a fitting ram includes a ram body, a removable ram disc and a magnet, a disc bore is formed in one end of said ram body to receive said ram disc, said cylinder rod is threaded into the other end of said ram body, said removable ram disc includes a relief opening which is sized to receive a threaded end of the hose fitting, said magnet is retained in a side of said disc bore to retain said removable ram disc.

16. The hand operated hose fitting swaging device of claim 14, further comprising:

said hand hydraulic pump includes an output port and a pump relief valve, said output port of said hydraulic cylinder is coupled to an input port of said hydraulic cylinder, wherein said pump relief valve is closed to operate said hand hydraulic pump.

17. The hand operated hose fitting swaging device of claim 14, further comprising:

said die base is retained on one end of a pair of support straps and said cylinder support is retained on the other end of said support straps.

* * * * *